United States Patent
Rummel et al.

(10) Patent No.: US 10,799,066 B2
(45) Date of Patent: Oct. 13, 2020

(54) SOCIAL GRILL SYSTEM

(71) Applicants: Randy Rummel, Huntington Beach, CA (US); Daniel Nichols, Huntington Beach, CA (US); Mark Steinman, Huntington Beach, CA (US); David Rockwell, New York, NY (US)

(72) Inventors: Randy Rummel, Huntington Beach, CA (US); Daniel Nichols, Huntington Beach, CA (US); Mark Steinman, Huntington Beach, CA (US); David Rockwell, New York, NY (US)

(*) Notice: Subject to any disclaimer, the term of this patent is extended or adjusted under 35 U.S.C. 154(b) by 971 days.

(21) Appl. No.: 15/051,552

(22) Filed: Feb. 23, 2016

(65) Prior Publication Data

US 2017/0238758 A1    Aug. 24, 2017

(51) Int. Cl.
*A47J 37/07*    (2006.01)

(52) U.S. Cl.
CPC ....... *A47J 37/0704* (2013.01); *A47J 37/0781* (2013.01)

(58) Field of Classification Search
CPC .... A47J 37/0704; A47J 37/0781; E04H 4/144
USPC .............................................. 126/25 R, 333
See application file for complete search history.

(56) References Cited

U.S. PATENT DOCUMENTS

| | | | | |
|---|---|---|---|---|
| 2,107,346 | A * | 2/1938 | Skjerven | A61H 33/06 4/528 |
| 5,186,274 | A * | 2/1993 | Hegman | B62J 15/00 180/227 |
| 5,333,540 | A * | 8/1994 | Mazzocchi | A47J 37/0763 126/25 R |
| 9,004,989 | B1 * | 4/2015 | Ogier | A22C 21/0069 452/135 |
| 2011/0271947 | A1 * | 11/2011 | Nilssen, II | A47J 37/0704 126/27 |
| 2015/0184411 | A1 * | 7/2015 | Muller | A63B 69/125 4/496 |

* cited by examiner

*Primary Examiner* — Steven B McAllister
*Assistant Examiner* — John E Bargero
(74) *Attorney, Agent, or Firm* — John D. Tran; Rhema Law Group

(57) ABSTRACT

A social grill method and system can include: a social surface including a top surface, a side extension, and a rounded edge between the top surface and the side extension, the side extension extended down away from the top surface; a chassis mounted below the social surface, the chassis including a fixed connection and a lid pivot; a mounting bracket coupled to the lid pivot; a lid coupled to the mounting bracket, the mounting bracket configured to rotate about the lid pivot and enable an open configuration with the lid retracted under the social surface and a closed configuration with the lid extending up over the social surface.

18 Claims, 11 Drawing Sheets

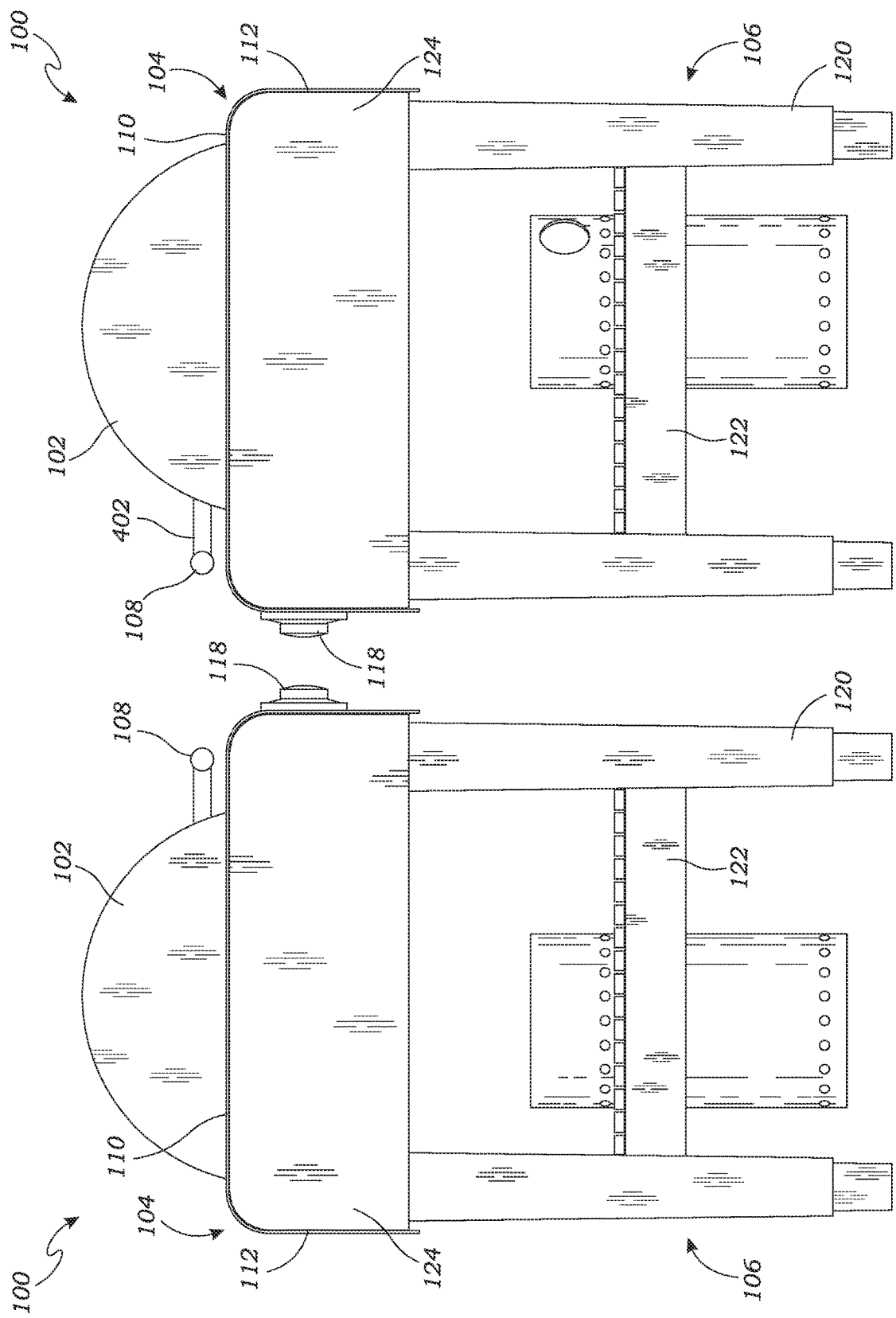

SOCIAL GRILL SYSTEM

TECHNICAL FIELD

This disclosure relates to grilling technology, more particularly grilling technology implementing a retractible lid.

BACKGROUND

A common method of cooking foods is grilling which is also known as barbecuing. A heat source can be placed below or next to food that is being cooked. Typically the heat source can produce a radiant heat, and a convection heat along with smoke that can flavor the food.

Most grilling appliances have hinged lids that can be opened and closed over the grilling sections, some are built with removable lids. These grilling appliances are commonly used for residential or commercial restaurant use and can be used in an indoor or outdoor area.

In the development of grilling appliances having hinged lids, one problem that has arisen is that the hinged lid will block a large area behind the hinged lid preventing access therefrom. Alternatively, with grilling appliances with removable lids, the lids must be stored somewhere and can get dirty, or create impediments to movements.

Solutions to these problems have been long sought but prior developments have not taught or suggested any complete solutions, and solutions to these problems have long eluded those skilled in the art. Thus there remains a considerable need for devices and methods of allowing greater access around a grilling appliance while preventing clutter and unsanitary conditions of storing a removable lid.

SUMMARY

A social grill system and methods, providing three hundred and sixty degree access while preventing clutter are disclosed. The social grill system and methods can include: a social surface including a top surface, a side extension, and a rounded edge between the top surface and the side extension, the side extension extended down away from the top surface; a chassis mounted below the social surface, the chassis including a fixed connection and a lid pivot; a mounting bracket coupled to the lid pivot; a lid coupled to the mounting bracket, the mounting bracket configured to rotate about the lid pivot and enable an open configuration with the lid retracted under the social surface and a closed configuration with the lid extending up over the social surface.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The social grill system is illustrated in the figures of the accompanying drawings which are meant to be exemplary and not limiting, in which like reference numerals are intended to refer to like components, and in which:

FIG. 4 is a left side view of the social grill system of FIG. 1.

FIG. 5 is a right view of the social grill system of FIG. 1.

DETAILED DESCRIPTION

Figure 1:
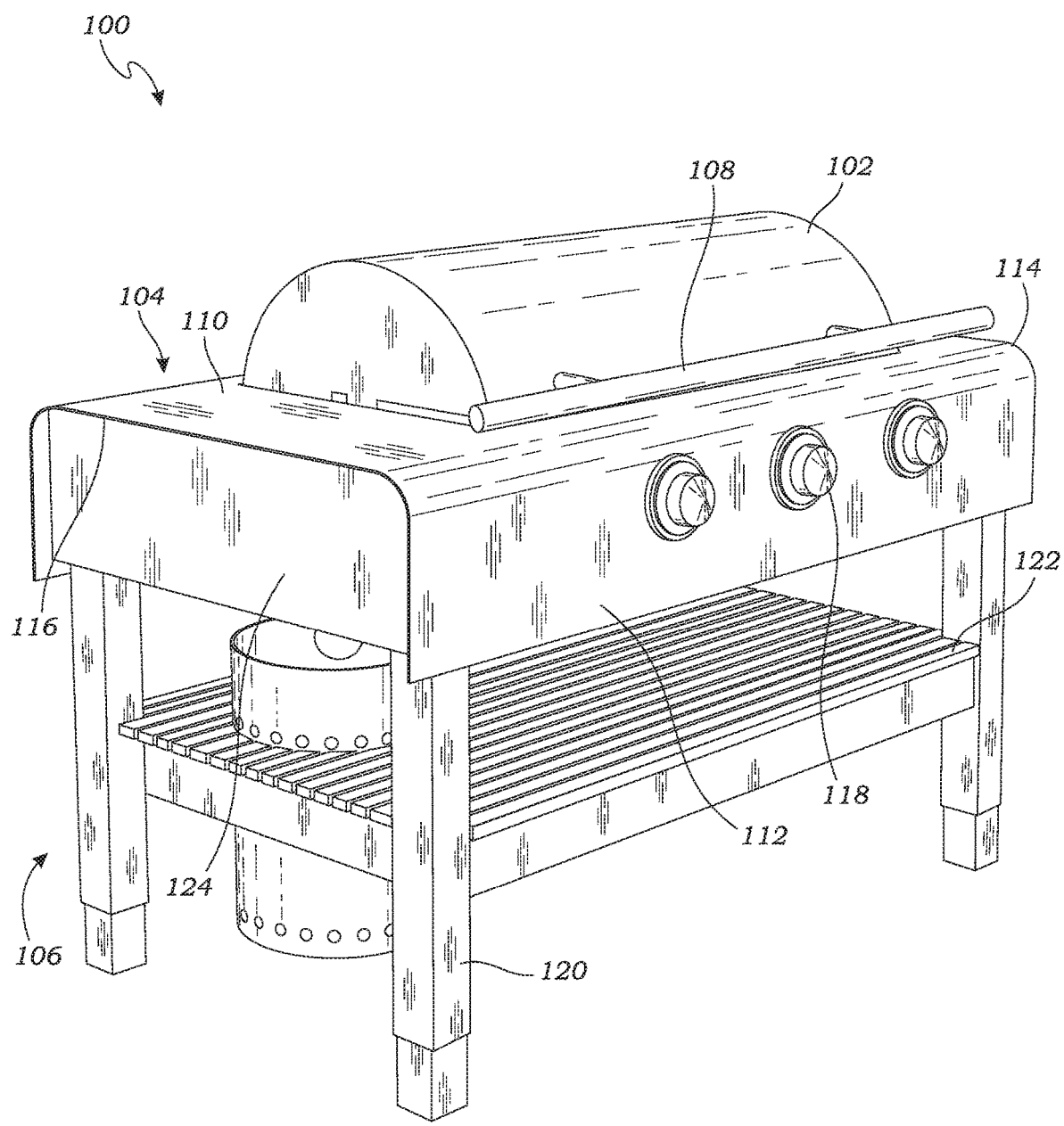
FIG. 1 is an isometric view of a social grill system in a closed configuration.

In the following description, reference is made to the accompanying drawings that form a part hereof, and in which are shown by way of illustration, embodiments in which the social grill system may be practiced. It is to be understood that other embodiments may be utilized and structural changes may be made without departing from the scope of the social grill system.

When features, aspects, or embodiments of the social grill system are described in terms of steps of a process, an operation, a control flow, or a flow chart, it is to be understood that the steps can be combined, performed in a different order, deleted, or include additional steps without departing from the social grill system as described herein.

The social grill system is described in sufficient detail to enable those skilled in the art to make and use the social grill system and provide numerous specific details to give a thorough understanding of the social grill system; however, it will be apparent that the social grill system may be practiced without these specific details.

In order to avoid obscuring the social grill system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the top plane or surface of the grating, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. As used herein, the term "coupled" means a physical connection.

Referring now to FIG. 1, therein is shown an isometric view of a social grill system 100 in a closed configuration. The social grill system 100 is depicted having a lid 102, a social surface 104, and a stand 106.

The lid 102 is depicted extending up from the middle of the social surface 104 and including a handle 108. In the closed configuration, the handle 108 can extend laterally out from the lid 102 over the social surface 104.

The social surface 104 can be formed and affixed above the stand 106. The social surface 104 can include a top surface 110 above the stand 106 with side extensions 112 extending down around the stand 106. The side extensions 112 can form lateral surfaces on exterior portions of the stand 106.

The social surface 104 can transition from the top surface 110 to the side extensions 112 with rounded edges 114. It is contemplated that the rounded edges 114 can be a flat edge making the top surface 110 and the side extensions 112 appear to have a chamfered edge.

The top surface 110, the side extensions 112 and the rounded edges 114 create an overhang 116 on two of the sides of the stand 106. The social surface 104 is contemplated to have the appearance of a table cloth spread over a table.

The social surface 104 can further include burner adjustment knobs 118. The burner adjustment knobs 118 can extend laterally from the side extensions 112. The stand 106 can include legs 120, a storage shelf 122, and a component housing 124.

The storage shelf 122 and the component housing 124 can be supported by the legs 120. The legs 120 can extend from a bottom portion of the component housing 124. The storage shelf 122 can be mounted to the legs 120 at a midpoint of the legs 120.

The social surface 104 can extend down past the component housing 124 to fully cover the component housing 124 along two sides of the component housing 124. The social surface 104 can extend past the component housing 124 laterally on the other two sides to form the overhang 116.

It is contemplated that the stand 106 can be replaced with a solid stand having cupboards for storage rather than a shelf and legs. When the stand 106 is replaced with a solid stand it is contemplated that the social surface 104 could still create the overhang 116 and still provide the side extensions 112 covering a top portion along two sides.

Figure 2:
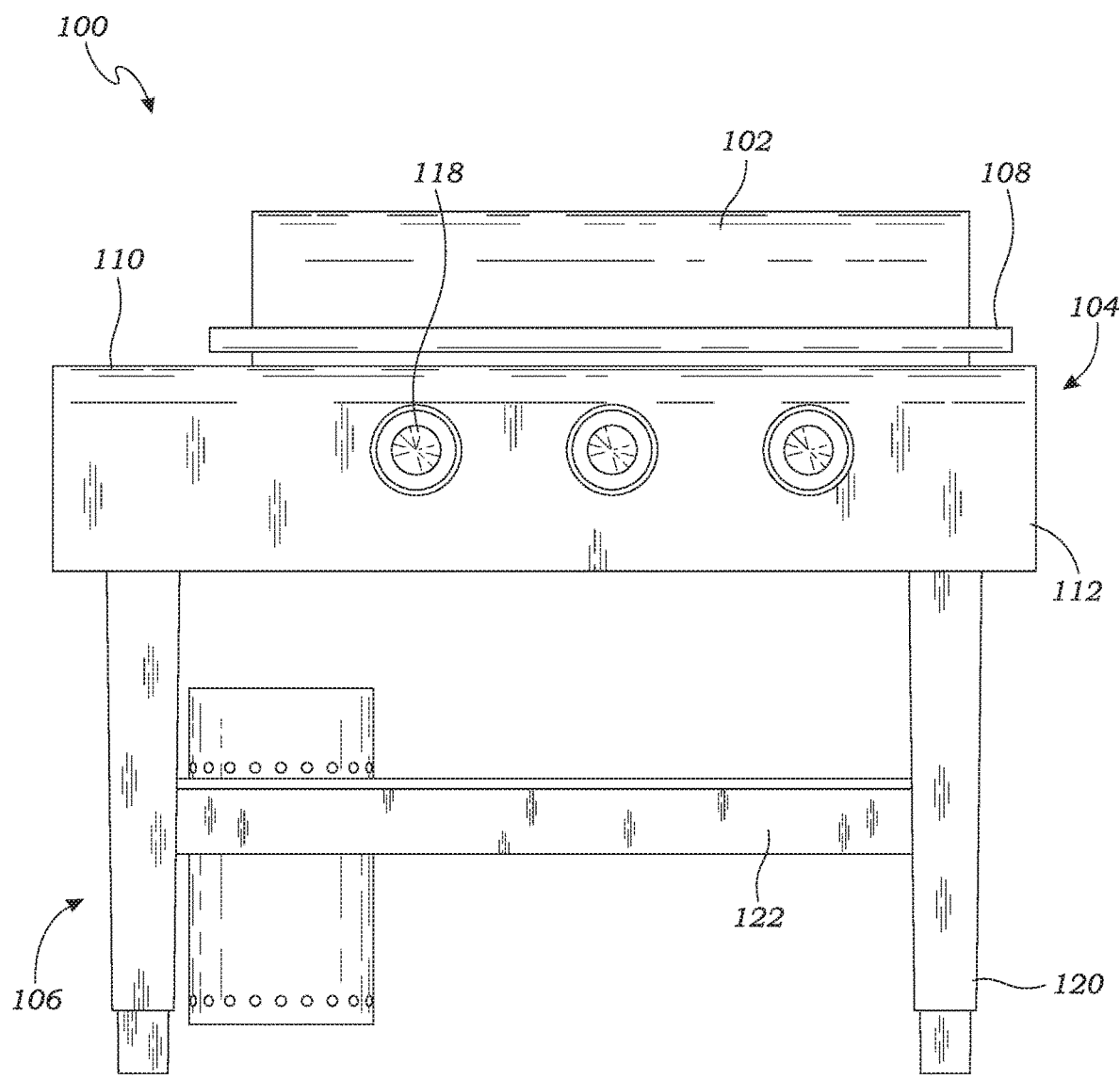
FIG. 2 is a front view of the social grill system of FIG. 1.

Referring now to FIG. 2, therein is shown a front view of the social grill system 100 of FIG. 1. The social grill system 100 is depicted having the social surface 104 with the side extensions 112 extending down toward the stand 106.

The lid 102 is shown extending up from the top surface 110 of the social surface 104 having the handle 108 affixed thereto. The burner adjustment knobs 118 are shown extended laterally from the side extensions 112 of the social surface 104.

The stand 106 is depicted having the legs 120 with the storage shelf 122 attached to the legs 120 near a middle of the legs 120. The legs 120 can extend down from underneath the social surface 104.

Figure 3:
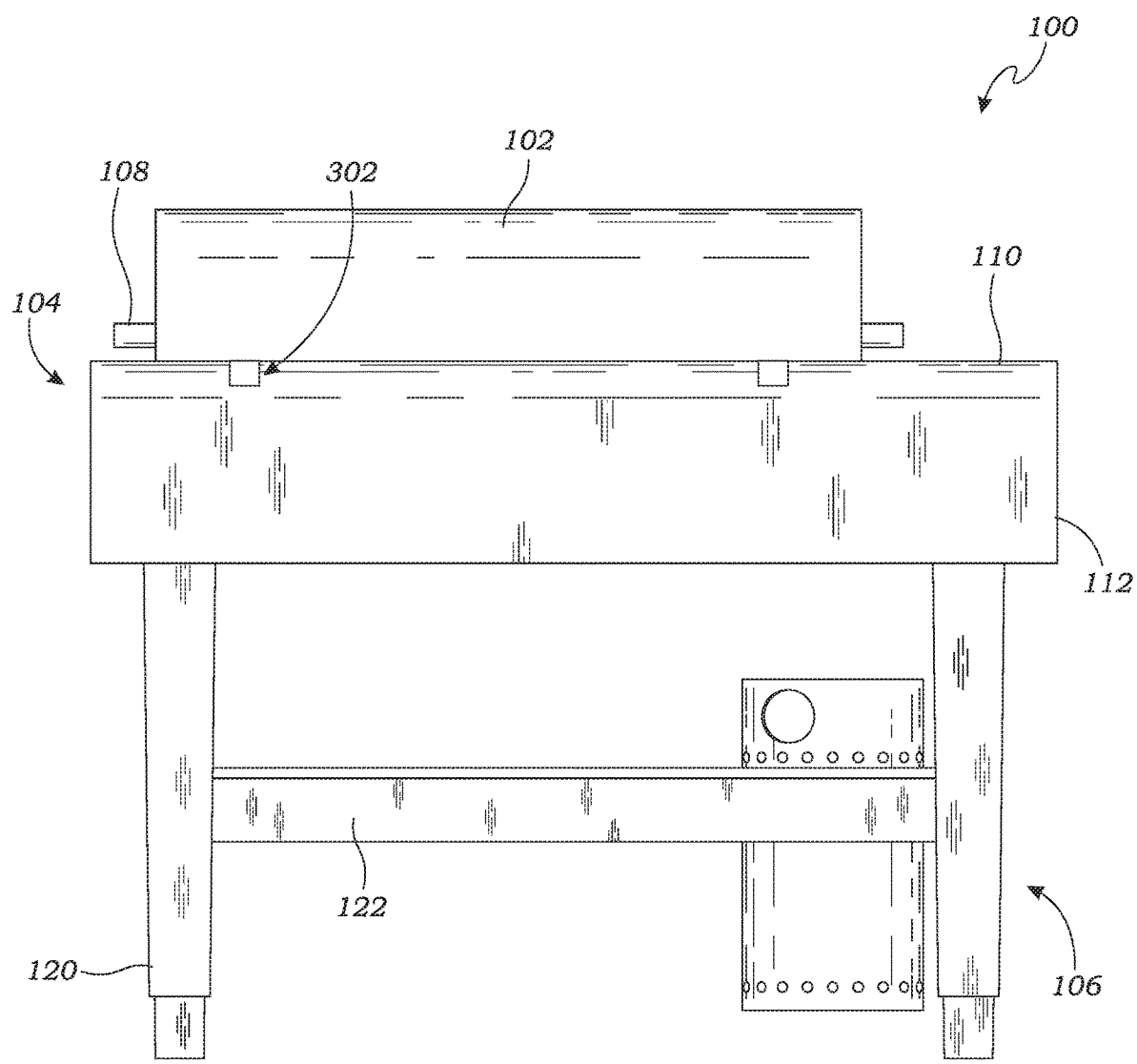
FIG. 3 is a back view of the social grill system of FIG. 1.

Referring now to FIG. 3, therein is shown a back view of the social grill system 100 of FIG. 1. The social grill system 100 is depicted having the social surface 104 with the side extensions 112 extending down toward the stand 106.

The lid 102 is shown extending up from the top surface 110 of the social surface 104 having the handle 108 extending past vertical sides of the lid 102. The stand 106 is depicted having the legs 120 with the storage shelf 122 attached to the legs 120 near a middle of the legs 120. The legs 120 can extend down from underneath the social surface 104.

The top surface 110 and one of the rounded edges 114 near the back of the social surface 104 are shown with cutouts 302 formed therein. It is contemplated that the cutouts 302 can allow the lid 102 to open completely leaving the top surface 110 as tall or taller than the handle 108 or the lid 102.

Referring now to FIG. 4, therein is shown a left side view of the social grill system 100 of FIG. 1. The social grill system 100 is depicted having the social surface 104 with the side extensions 112 extending down toward the stand 106.

The lid 102 is shown extending up from the top surface 110 of the social surface 104 having the handle 108 affixed thereto. The handle 108 is depicted as including handle extensions 402. The handle extensions 402 can extend laterally out from the lid 102.

The handle extensions 402 can be directly coupled between the handle 108 and the lid 102. It is contemplated that the handle extensions 402 can have a diameter less than a width of the cutouts 302 of FIG. 3 to allow the handle extensions 402 to fit within the cutouts 302. The burner adjustment knobs 118 are shown extended laterally from the side extensions 112 of the social surface 104.

The stand 106 is depicted having the legs 120 with the storage shelf 122 attached to the legs 120 near a middle of the legs 120. The legs 120 can extend down from the component housing 124 underneath the social surface 104.

Referring now to FIG. 5, therein is shown a right view of the social grill system 100 of FIG. 1. The social grill system 100 is depicted having the social surface 104 with the side extensions 112 extending down toward the stand 106.

The lid 102 is shown extending up from the top surface 110 of the social surface 104 having the handle 108 affixed thereto. The handle 108 is depicted as including handle extensions 402. The handle extensions 402 can extend laterally out from the lid 102.

The handle extensions 402 can be directly coupled between the handle 108 and the lid 102. It is contemplated that the handle extensions 402 can have a diameter less than a width of the cutouts 302 of FIG. 3 to allow the handle extensions 402 to fit within the cutouts 302. The burner adjustment knobs 118 are shown extended laterally from the side extensions 112 of the social surface 104.

The stand 106 is depicted having the legs 120 with the storage shelf 122 attached to the legs 120 near a middle of the legs 120. The legs 120 can extend down from the component housing 124 underneath the social surface 104.

Figure 6:
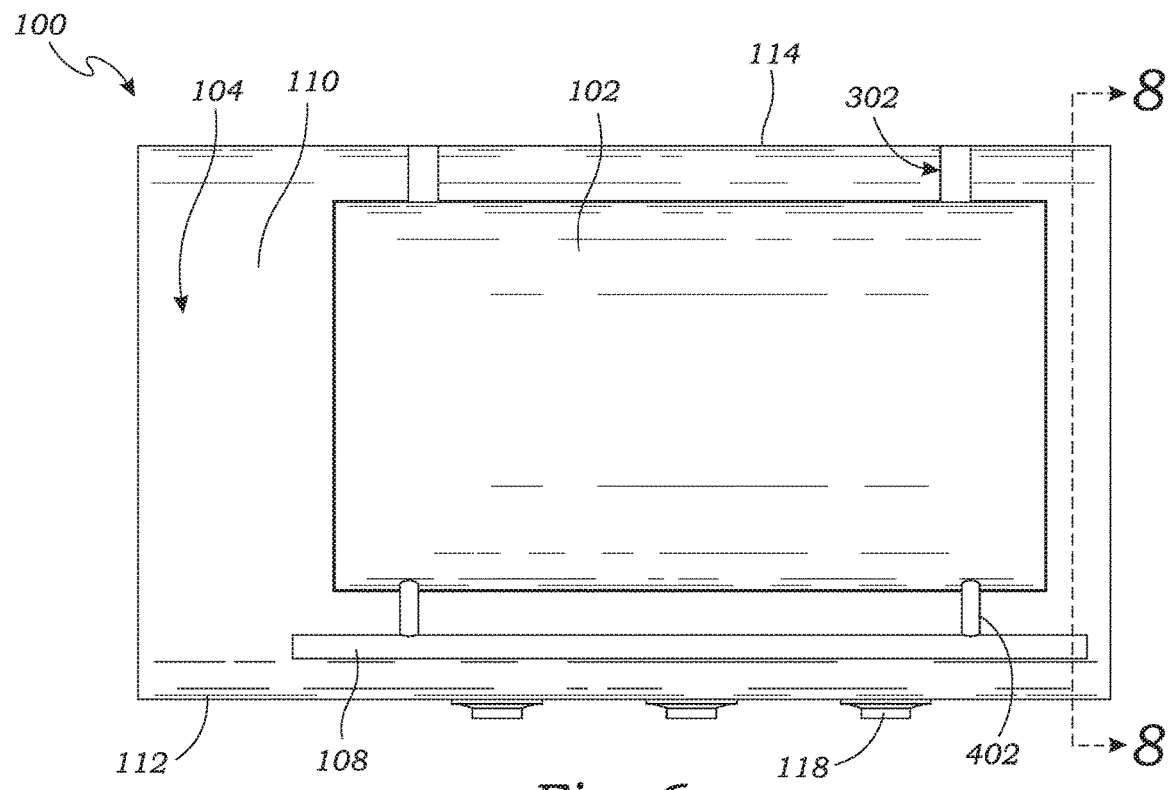
FIG. 6 is a top view of the social grill system of FIG. 1.

Referring now to FIG. 6, therein is shown a top view of the social grill system 100 of FIG. 1. The social grill system 100 is shown with the lid 102 extending from the top surface 110 of the social surface 104. The burner adjustment knobs 118 are depicted extending from the side extensions 112.

The handle extensions 402 can directly couple the lid 102 to the handle 108 and are shown having a small diameter than the cutouts 302. The cutouts 302 are depicted extending through the top surface 110 and one of the rounded edges 114 near the back of the social surface 104 opposite the burner adjustment knobs 118. It is contemplated that the cutouts 302 could further extend into the side extensions 112 to allow the lid 102 to retract more than one hundred eighty degrees.

Figure 7:
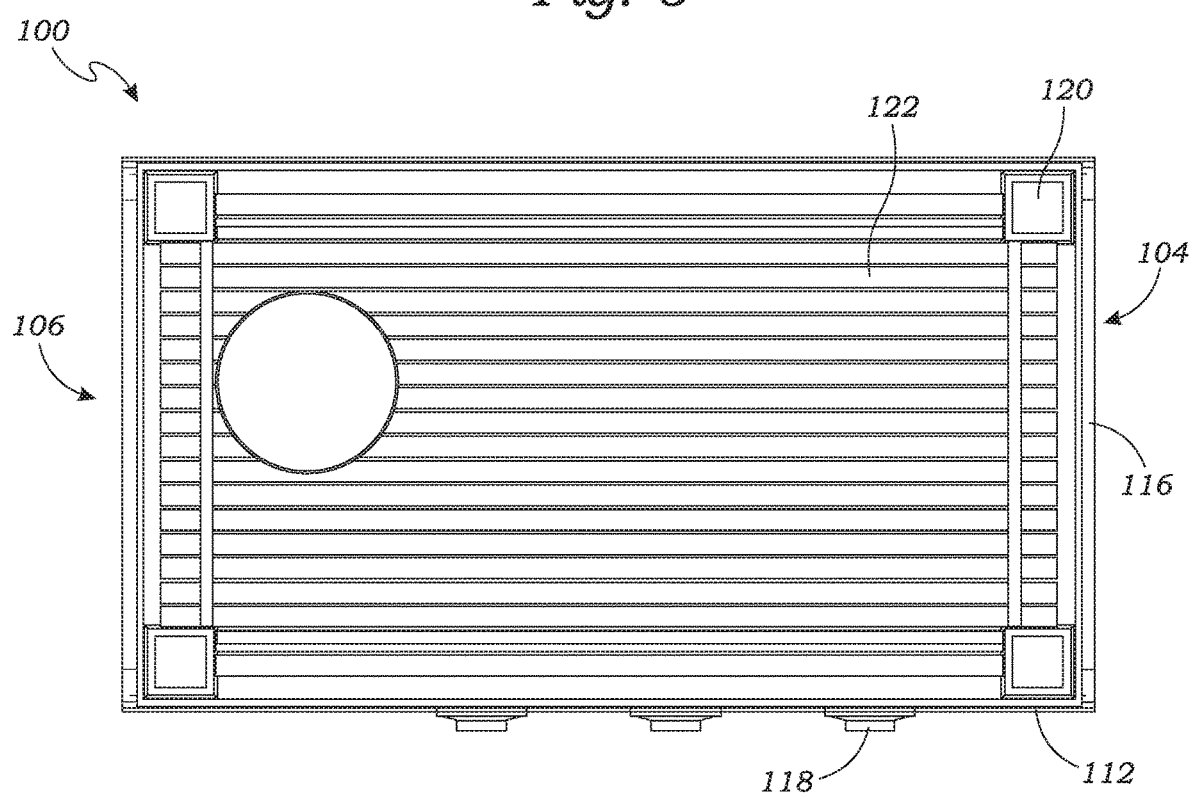
FIG. 7 is a bottom view of the social grill system of FIG. 1.

Referring now to FIG. 7, therein is shown a bottom view of the social grill system 100 of FIG. 1. The social grill system 100 is depicted having the stand 106 with the overhang 116 of the social surface 104 extending laterally past the stand 106.

The legs 120 of the stand 106 can be seen attached to the storage shelf 122 on two sides. The burner adjustment knobs 118 are shown extending from the side extensions 112 of the social surface 104.

Figure 8:
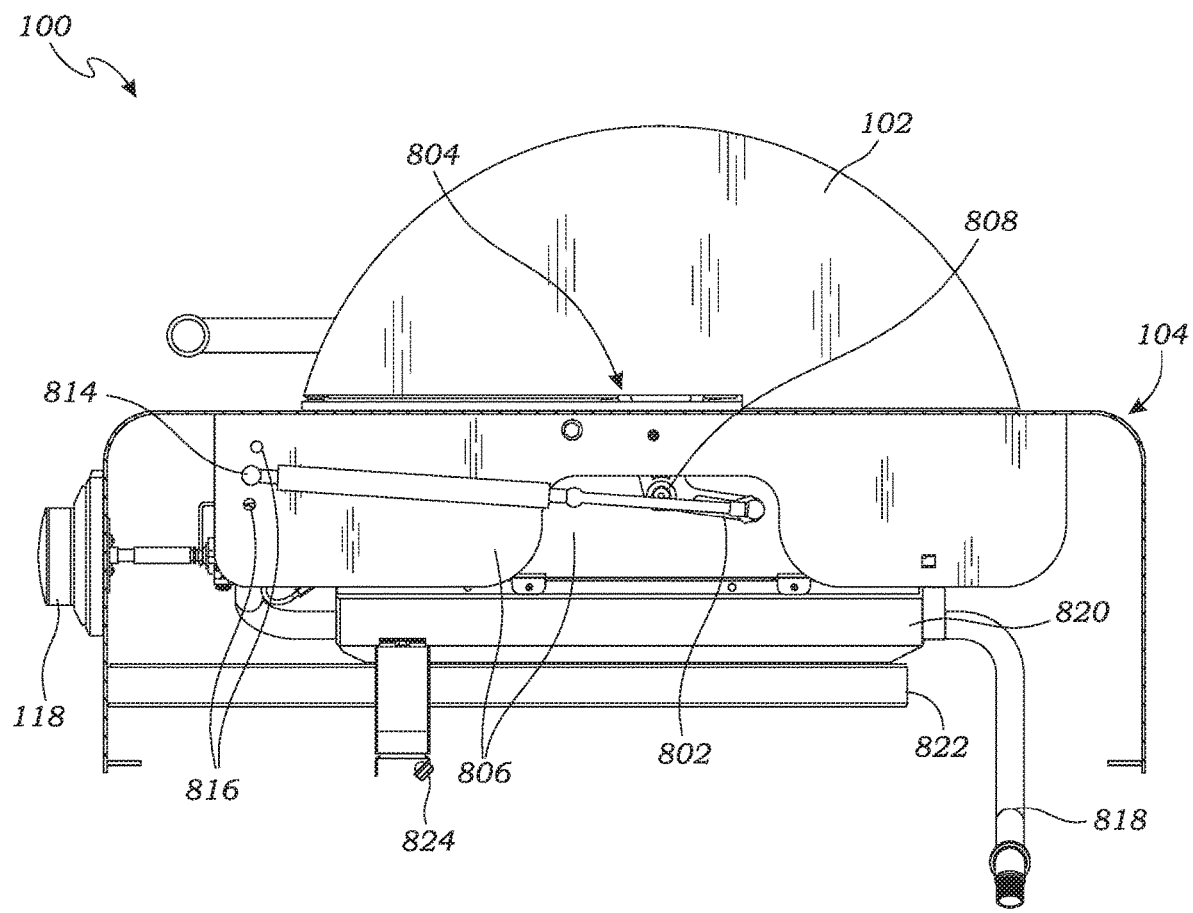
FIG. 8 is a cross-sectional view of the social grill system along the line 8-8 of FIG. 6.

Referring now to FIG. 8, therein is shown a cross-sectional view of the social grill system 100 along the line 8-8 of FIG. 6. The social grill system 100 is shown having the social surface 104 with the lid 102 extending thereover.

The lid 102 can be directly coupled to a mounting bracket 802. The mounting bracket 802 can be a C-shaped mounting bracket. The mounting bracket 802 can attach to the lid 102 with a forked connection 804. The forked connection 804 including two prongs attached to an inner surface of the lid 102, and the forked connection 804 forking outward and toward the lid 102, the forked connection 804 can increase the distribution of stresses for a more structurally rigid and stronger connection between the mounting bracket 802 and the lid 102.

The mounting bracket 802 can be mounted to a chassis 806 at a lid pivot 808. The mounting bracket 802 attached to the chassis 806 at the pivot 808 can allow the lid 102 to rotate one hundred and eighty degrees to a fully open position as shown and discussed below.

The pivot 808 can be attached to the mounting bracket 802 near a middle portion of the mounting bracket 802. The end of the mounting bracket 802 opposite the forked connection 804 can be a gas spring live point 810 and can be coupled to a gas spring 812.

The gas spring 812 can extend from the gas spring live point 810 to a fixed connection 814 on the chassis 806. As the lid 102 is opened, the gas spring 812 can be compressed and allow the lid 102 to be lowered or opened at a constant speed or constant resistance.

The fixed connection 814 can be changed to adjust the speed of the gas spring 812 or the resistance of the gas spring 812. Illustratively, the fixed connection 814 can be moved to optional fixed points 816. The optional fixed points 816 are depicted in a vertical ark with a radius the length of the gas spring 812.

It is contemplated that moving the fixed connection 814 higher can reduce the resistance to opening the lid 102 while moving the fixed connection 814 lower on the optional fixed points 816 can increase the resistance to opening the lid 102.

Below the chassis 806 a gas input 818 and burner 820 are depicted over a drip tray 822. The burner adjustment knobs 118 can be mechanically coupled to the burner 820 and can control valves that can control the heat from the burner 820.

Below the drip tray 822 a lid stopper 824 can be mounted. The lid stopper 824 can be adjusted or repositioned so that the lid 102 will stop at the desired position. Further it is contemplated that the social grill system 100 can include a plurality of the lid stoppers 824 along a length of the lid 102 for distributing the weight and force of the lid 102 along its length.

Figure 9:
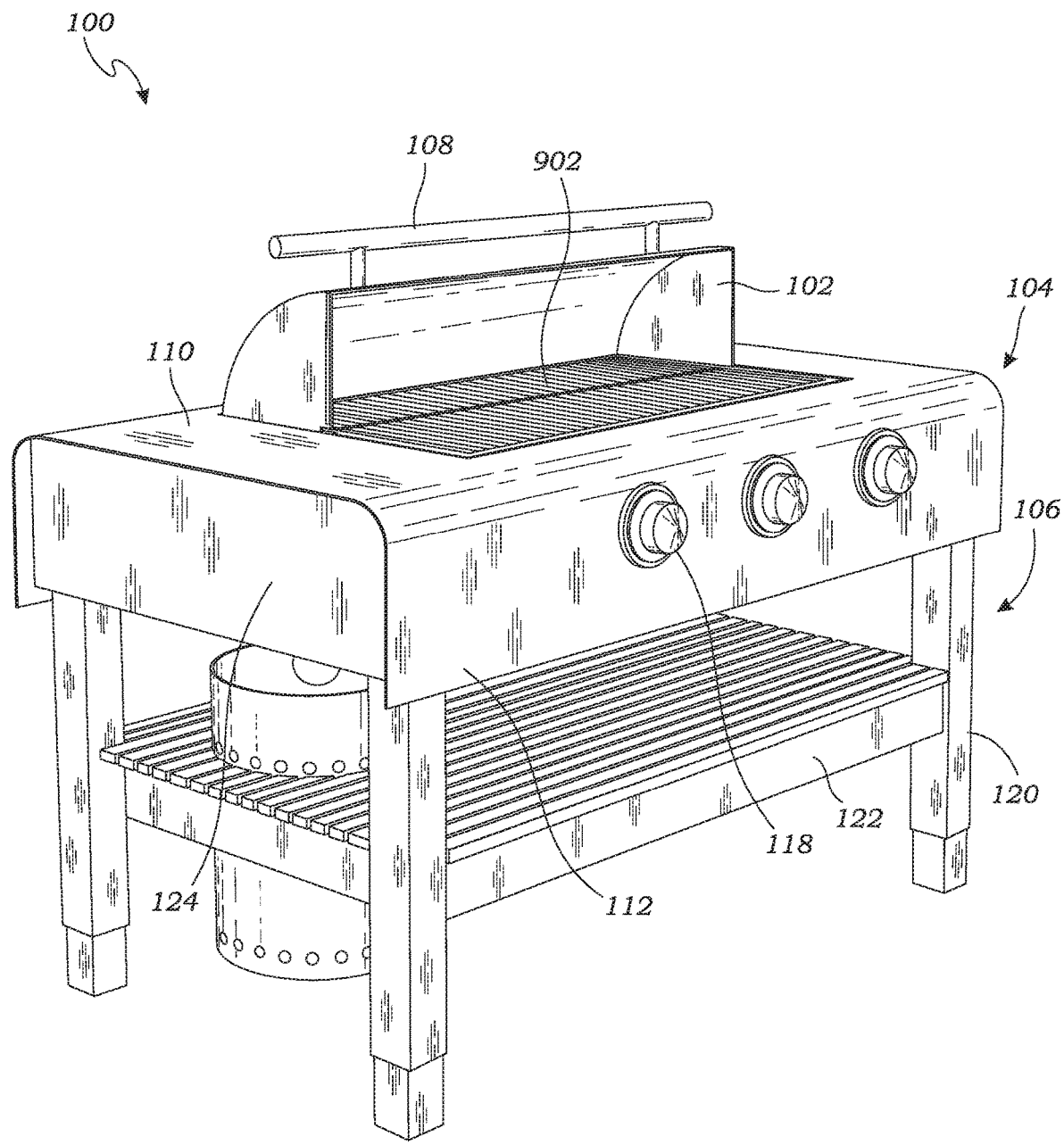
FIG. 9 is an isometric view of a social grill system in a partially open configuration.

Referring now to FIG. 9, therein is shown an isometric view of a social grill system 100 in a partially open configuration. The lid 102 is depicted extending up from the middle of the social surface 104 with the handle 108 extending vertically out from the lid 102 and over the lid 102.

The lid 102 can pivot about the pivot 808 of FIG. 8 and expose a grating 902 thereunder. The grating 902 can extend the full length of the lid 102 and can be level with the top surface 110 of the social surface 104.

The grating 902 can be partially under and partially exposed from the lid 102 due to the position of the pivot 808 at a center point of the width of the lid 102. The burner adjustment knobs 118 are shown extended laterally from the side extensions 112 of the social surface 104.

The stand 106 is depicted having the legs 120 with the storage shelf 122 attached to the legs 120 near a middle of the legs 120. The legs 120 can extend down from underneath the social surface 104.

Figure 10:
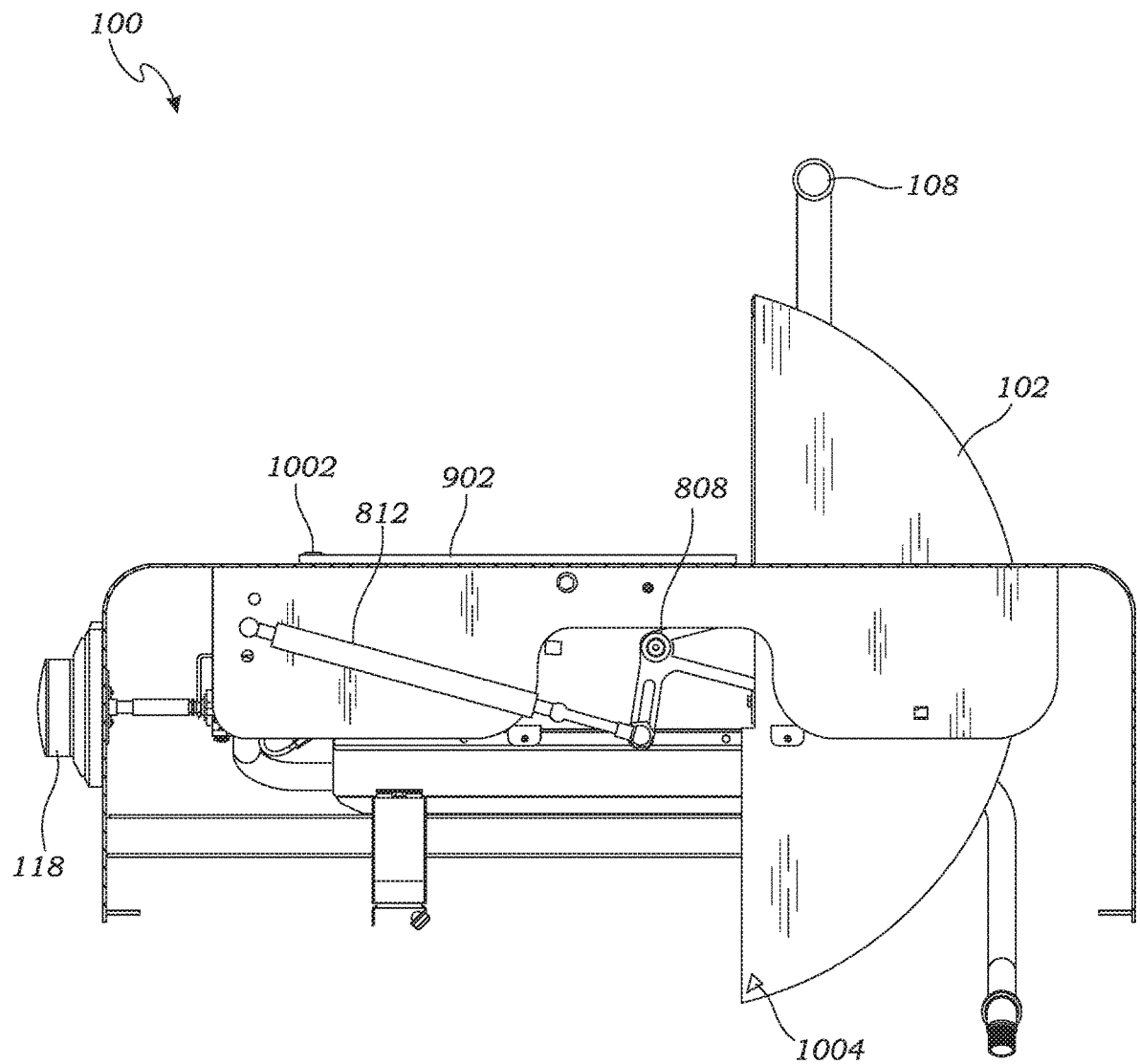
FIG. 10 is a cross-sectional view of the social grill system of FIG. 9.

Referring now to FIG. 10, therein is shown a cross-sectional view of the social grill system 100 of FIG. 9. The gas spring 812 is depicted as compressed further than the gas spring 812 depicted in FIG. 8 due to the lid 102 being rotated to the partially open configuration.

The lid 102 is depicted extending an equal height above and below the pivot 808 due to the neutral position of the pivot 808 along the width of the lid 102. In the partially open configuration an upper lid stop 1002 is depicted on the grating 902.

It is contemplated that the lid 102 can rest on the upper lid stop 1002 when in the closed configuration, can rest on the grating 902 when in the closed configuration, or a combination thereof. The lid 102 is further shown with a lid extension 1004.

The lid extension 1004 can add additional mass to the lid 102 to compensate for the extra weight that the handle 108 adds to the other end of the lid 102. This can ensure that the lid 102 is balanced about the pivot 808.

Figure 11:
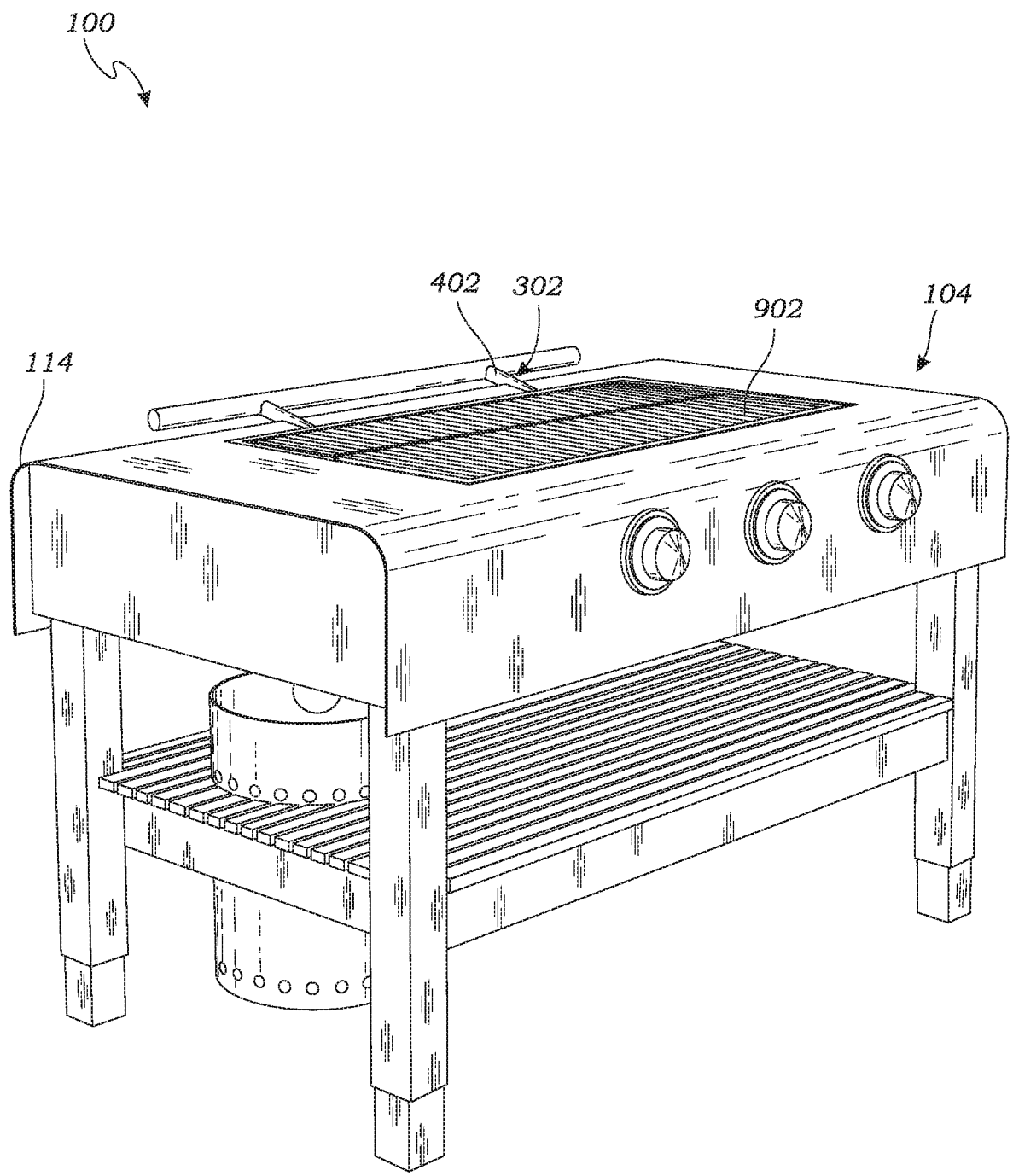
FIG. 11 is an isometric view of a social grill system in an open configuration.

Referring now to FIG. 11, therein is shown an isometric view of a social grill system 100 in an open configuration. The lid 102 of FIG. 1 is shown fully retracted below the social surface 104 with the handle extensions 402 fitting within the cutouts 302. The handle 108 is depicted extending laterally out from the cutouts 302 away from the rounded edges 114.

The social grill system 100 can now be accessed from all sides and can provide a large flat space for food to be cooked and utensils to be placed. It has been discovered that the lid 102, social surface 104 and grating 902 enable a social experience and point for users to congregate while simultaneously reducing the clutter of removable lids.

Figure 12:
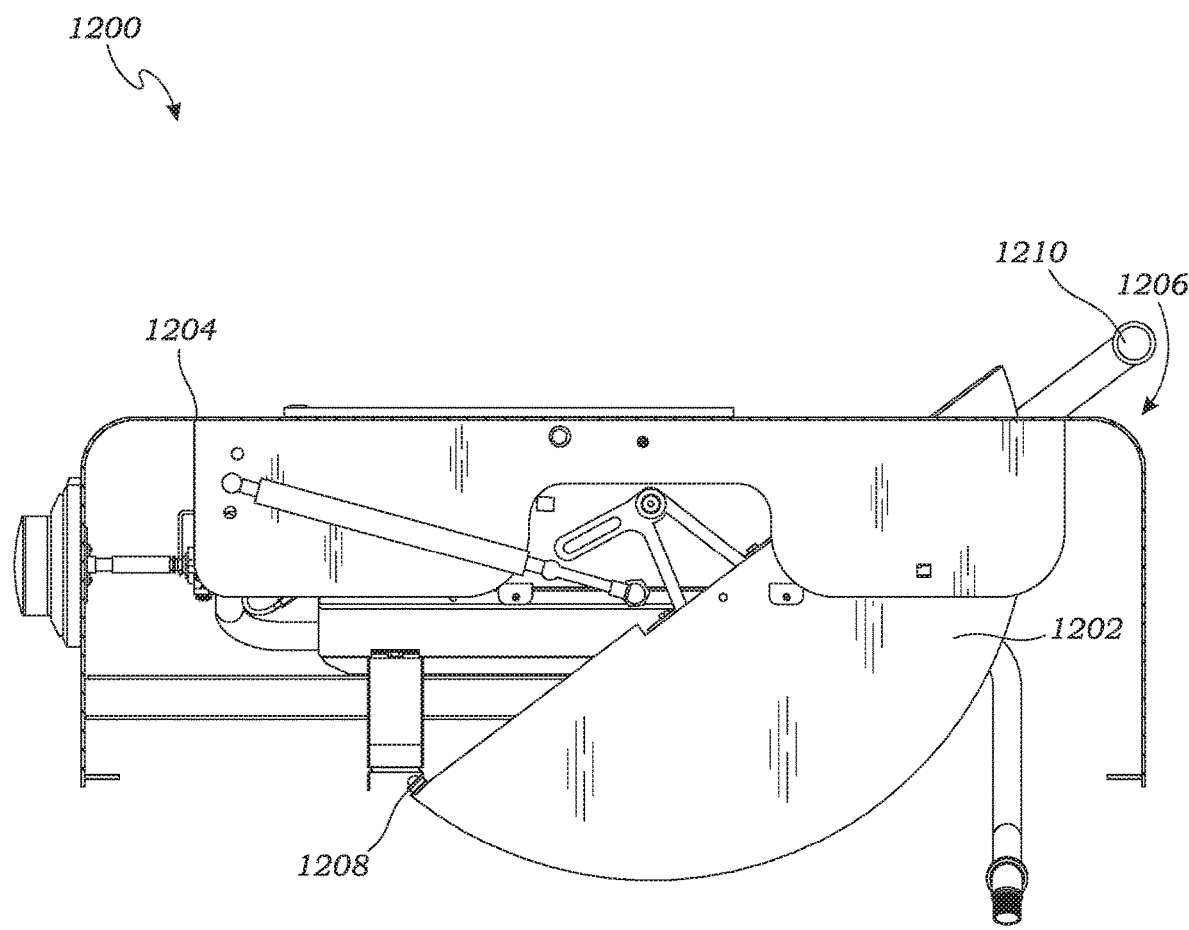
FIG. 12 is a cross-sectional view of the social grill system of FIG. 11.

Referring now to FIG. 12, therein is shown a cross-sectional view of the social grill system 1200 in an alternative embodiment. The social grill system 1200 is depicted having a lid 1202 in an open configuration.

In contrast to the lid 102 of FIG. 11, the lid 1202 is open and still partially exposed from a top surface 1204 of a social surface 1206. This results from the lid 1202 resting on a lid stopper 1208.

Further the cutouts 302 of FIG. 3 are not present within the social surface 1206. It is contemplated that utilizing the lid stopper 1208 to stop the lid 1202 above the top surface 1204 of the social surface 1206 can beneficially make the lid 1202 easier to close by making a handle 1210 of the lid 1202 easier to reach.

In the alternative configuration of FIG. 11, the lid stopper 824 of FIG. 8 can be positioned so to allow the lid 102 of FIG. 1 to fully retract under the top surface 110 of FIG. 1.

Figure 13:
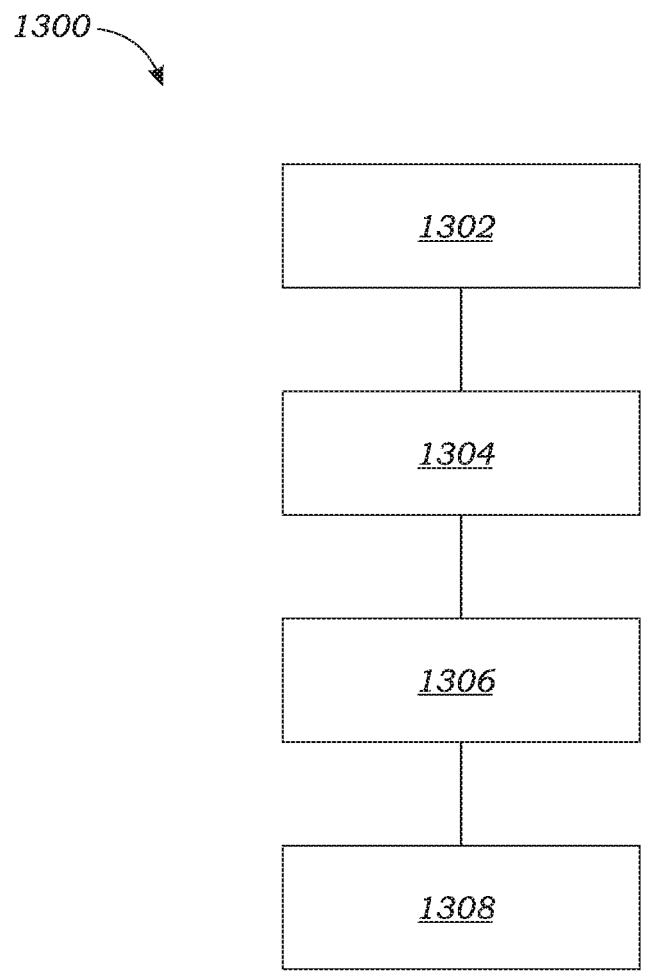
FIG. 13 is a method of manufacturing the social grill system.

Referring now to FIG. 13, therein is shown a method 1300 of manufacturing the social grill system 100 of FIG. 1. The method 1300 can include: providing a social surface, the social surface including a top surface, a side extension, and a rounded edge between the top surface and the side extension, the side extension extending down away from the top surface in a block 1302; mounting a chassis below the social surface, the chassis including a fixed connection and a lid pivot in a block 1304; coupling a mounting bracket to the lid pivot in a block 1306, and coupling a lid to the mounting bracket, the mounting bracket configured to rotate about the lid pivot and enable an open configuration with the lid retracted under the social surface and a closed configuration with the lid extending up over the social surface in a block 1308

Thus, it has been discovered that the social grill system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the social grill system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A social grill system comprising; a social surface including a top surface, a side extension, and a rounded edge between the top surface and the side extension, the side extension extended down away from the top surface, a chassis mounted below the social surface, the chassis including a fixed connection and a lid pivot; a mounting bracket coupled to the lid pivot; and a lid coupled to the mounting bracket, the lid attached to a handle with a handle extension, mounting bracket configured to rotate about the lid pivot and enable an open configuration with the lid retracted under the social surface with the handle resting on or below the top surface providing three hundred and sixty degree access to the social surface and a closed configuration with the lid extending up over the social surface.

2. The system of claim 1 further comprising a gas spring mounted between the fixed connection and the mounting bracket.

3. The system of claim 2 wherein the chassis includes a fixed point positioned to enable a different speed or resistance of the gas spring from the fixed connection.

4. The system of claim 1 further comprising: :cutouts formed into the side extension.

5. A social grill system comprising: a social surface including a top surface, a &de extension, and a rounded edge between the top surface and the side extension, the side extension extended down away from the top surface, and a cutout within the top surface; a stand mounted below the social surface; a chassis mounted below the social surface, the chassis including a fixed connection and a lid pivot; a mounting bracket coupled to the lid pivot; and a lid coupled to the mounting bracket, the lid attached to a handle with a handle extension the mounting bracket configured to rotate about the lid pivot and enable an open configuration with the lid retracted under the social surface with the handle resting on or below the top surface proving three hundred and sixty degree access to the social surface and a closed configuration with the lid extending up over the social surface.

6. The system of claim 5 wherein the side extension forms a lateral surface on exterior portions of the stand.

7. The system of claim 5 wherein the top surface creates an overhang above the stand.

8. The system of claim 5 further comprising a drip tray coupled to the chassis.

9. The system of claim 8 further comprising a lid stopper mounted to the drip tray.

10. A method of manufacturing a social grill system comprising: providing a social surface, the social surface including a top surface, a side extension, and a rounded edge between the top surface and the side extension, the side extension extending down away from the top surface, and a cutout within the top surface; mounting a chassis below the social surface, the chassis including a fixed connection and a lid pivot; coupling a mounting bracket to the lid pivot; and coupling a lid to the mounting bracket, the lid attached to a handle with a handle extension, the mounting bracket configured to rotate about the lid pivot and enable an open configuration with the lid retracted under the social surface with the handle resting on or below the top surface proving three hundred and sixty degree access to the social surface and a closed configuration with the lid extending up over the social surface.

11. The method of claim 10 further comprising mounting a gas spring between the fixed connection and the mounting bracket.

12. The method of claim 11 wherein:
mounting the chassis includes mounting the chassis including a fixed point; and
mounting the gas spring includes adjusting the gas spring from the fixed connection to the fixed point for adjusting speed or resistance of the gas spring.

13. The method of claim 10 further comprising: forming a cutout into the side extension.

14. The method of claim 10 further comprising mounting the social surface above a stand.

15. The method of claim 14 wherein mounting the social surface includes mounting the social surface above the stand with the side extension forming a lateral surface on exterior portions of the stand.

16. The method of claim 14 wherein mounting the social surface includes mounting the social surface above the stand with the top surface creating an overhang above the stand.

17. The method of claim 14 further comprising coupling a drip tray to the chassis.

18. The method of claim 17 further comprising mounting a lid stopper to the drip tray.

* * * * *